United States Patent
Singh et al.

(10) Patent No.: US 6,789,184 B1
(45) Date of Patent: Sep. 7, 2004

(54) INSTRUCTION ADDRESS GENERATION AND TRACKING IN A PIPELINED PROCESSOR

(75) Inventors: Ravi P. Singh, Austin, TX (US); Charles P. Roth, Austin, TX (US); Gregory A. Overkamp, Austin, TX (US)

(73) Assignees: Intel Corporation, Santa Clara, CA (US); Analog Devices, Inc., Norwood, MA (US)

(*) Notice: Subject to any disclaimer, the term of this patent is extended or adjusted under 35 U.S.C. 154(b) by 676 days.

(21) Appl. No.: 09/676,058

(22) Filed: Sep. 29, 2000

(51) Int. Cl.[7] .................................................. G06F 9/38
(52) U.S. Cl. ........................................ 712/205; 712/210
(58) Field of Search ............................ 712/205, 206, 712/229, 230, 233, 234, 238, 239, 240, 244, 210, 214

(56) References Cited

U.S. PATENT DOCUMENTS

| | | | |
|---|---|---|---|
| 5,450,553 A | * | 9/1995 | Kitagaki et al. ............. 711/214 |
| 5,542,109 A | * | 7/1996 | Blomgren et al. ........... 712/234 |
| 5,682,492 A | * | 10/1997 | McFarland et al. .......... 712/214 |
| 5,692,167 A | | 11/1997 | Grochowski et al. |
| 5,815,696 A | | 9/1998 | Tanaka et al. |
| 5,848,268 A | * | 12/1998 | Matsuo ........................ 712/233 |
| 5,881,265 A | * | 3/1999 | McFarland et al. .......... 712/218 |
| 5,922,070 A | | 7/1999 | Swoboda et al. |
| 5,941,980 A | | 8/1999 | Shang et al. |
| 5,948,100 A | | 9/1999 | Hsu et al. |
| 6,260,134 B1 | * | 7/2001 | Zuraski et al. ............... 712/210 |

* cited by examiner

*Primary Examiner*—Henry W. H. Tsai
(74) *Attorney, Agent, or Firm*—Fish & Richardson P.C.

(57) ABSTRACT

In an embodiment, an address pipeline corresponding to an instruction pipeline in a processor, for example, a digital signal processor (DSP), may generate and track the instruction address of each instruction at each stage. The address pipeline may include program count (PC) generation logic to automatically calculate the PC of the next instruction based on the width of the current instruction for sequential program flow. The address pipeline may also track valid bits associated with each instruction and store the address of the oldest valid instruction for return to the original program flow after a disruptive event.

20 Claims, 5 Drawing Sheets

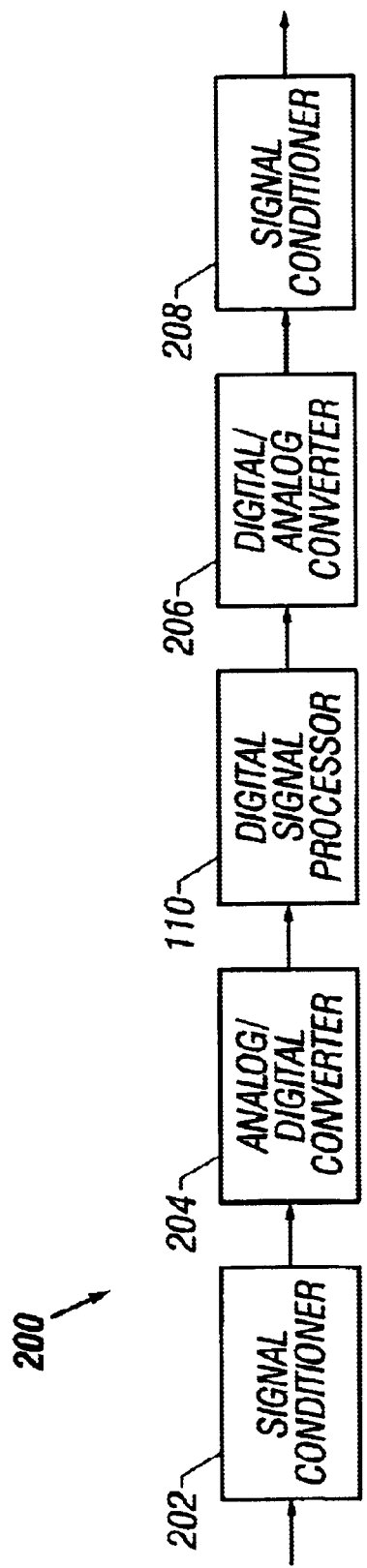
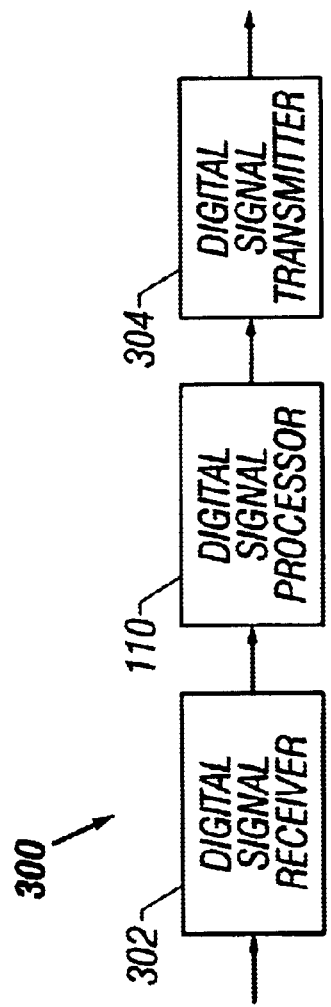

INSTRUCTION ADDRESS GENERATION AND TRACKING IN A PIPELINED PROCESSOR

TECHNICAL FIELD

This invention relates to pipelined digital signal processors, and more particularly to generating and tracking the addresses of each instructions in the instruction pipeline.

BACKGROUND

Digital signal processing is concerned with the representation of signals in digital form and the transformation or processing of such signal representation using numerical computation. Digital signal processing is a widely used technology for many of today's high technology products in fields such as wireless communications, networking, and multimedia. One reason for the prevalence of digital signal processing technology has been the development of low cost, powerful digital signal processors (DSPs) that provide engineers the reliable computing capability to implement these products cheaply and efficiently. Since the development of the first DSPS, DSP architecture and design have evolved to the point where even sophisticated real-time processing of video-rate sequences can be performed.

DSPs are often used for a variety of multimedia applications such as digital video, imaging, and audio. DSPs can manipulate the digital signals to create and open such multimedia files.

MPEG-1 (Motion Picture Expert Group), MPEG-2, MPEG-4 and H.263 are digital video compression standards and file formats. These standards achieve a high compression rate of the digital video signals by storing mostly changes from one video frame to another, instead of storing each entire frame. The video information may then be further compressed using a number of different techniques.

The DSP may be used to perform various operations on the video information during compression. These operations may include motion search and spatial interpolation algorithms. The primary intention is to measure distortion between blocks within adjacent frames. These operations are computationally intensive and may require high data throughput.

The MPEG family of standards is evolving to keep pace with the increasing bandwidth requirements of multimedia applications and files. Each new version of the standard presents more sophisticated algorithms that place even greater processing requirements on the DSPs used in MPEG compliant video processing equipment.

Video processing equipment manufacturers often rely on application-specific integrated circuits (ASICs) customized for video encoding under the MPEG and H.263 standards. However, ASICs are complex to design, costly to produce and less flexible in their application than general-purpose DSPs.

DESCRIPTION OF DRAWINGS

These and other features and advantages of the invention will become more apparent upon reading the following detailed description and upon reference to the accompanying drawings.

FIG. 2 is a block diagram of a signal processing system according to an embodiment.

FIG. 3 is a block diagram of an alternative signal processing system according to an embodiment.

DETAILED DESCRIPTION

Figure 1:
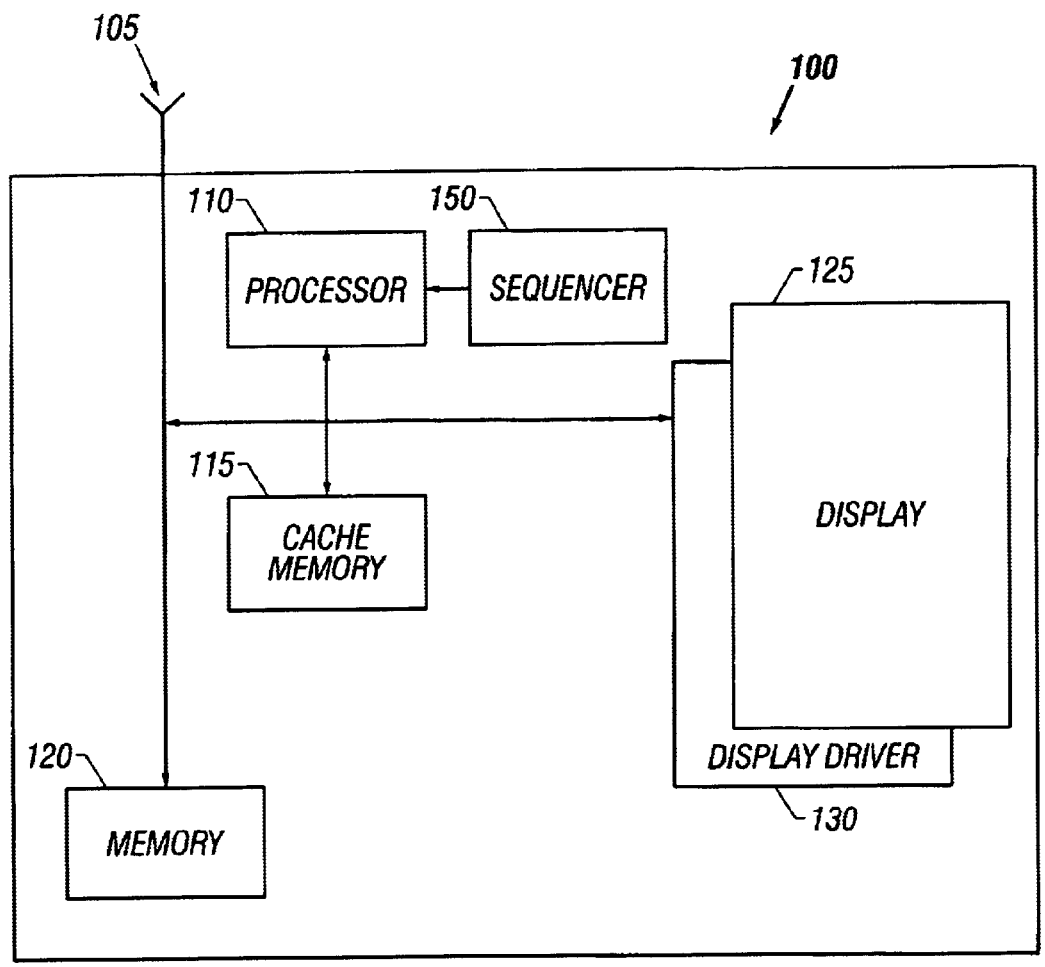
FIG. 1 is a block diagram of a mobile video device utilizing a processor according to an embodiment.

FIG. 1 illustrates a mobile video device 100 including a processor according to an embodiment of the invention. The mobile video device 100 may be a hand-held device which displays video images produced from an encoded video signal received from an antenna 105 or a digital video storage medium 120, e.g., a digital video disc (DVD) or a memory card. A processor 110 communicates with a cache memory 115 which may store instructions and data for the processor operations. The processor 110 may be a microprocessor, a digital signal processor (DSP), a microprocessor controlling a slave DSP, or a processor with an hybrid microprocessor/DSP architecture. For the purposes of this application, the processor 110 will be referred to hereinafter as a DSP 110.

The DSP 110 may perform various operations on the encoded video signal, including, for example, analog-to-digital conversion, demodulation, filtering, data recovery, and decoding. The DSP 110 may decode the compressed digital video signal according to one of various digital video compression standards such as the MPEG-family of standards and the H.263 standard. The decoded video signal may then be input to a display driver 130 to produce the video image on a display 125.

Hand-held devices generally have limited power supplies. Also, video decoding operations are computationally intensive. Accordingly, a processor for use in such a device is advantageously a relatively high speed, low power device.

The DSP 110 may have a deeply pipelined, load/store architecture. By employing pipelining, the performance of the DSP may be enhanced relative to a non-pipelined DSP. Instead of fetching a first instruction, executing the first instruction, and then fetching a second instruction, a pipelined DSP 110 may fetch the second instruction concurrently with execution of the first instruction, thereby improving instruction throughput. Further, the clock cycle of a pipelined DSP may be shorter than cycles of a non-pipelined DSP, in which the instruction is fetched and executed in the same clock cycle.

Such a DSP 110 is contemplated for use in video camcorders, teleconferencing, PC video cards, and High-Definition Television (HDTV). In addition, the DSP 110 is also contemplated for use in connection with other technologies utilizing digital signal processing such as voice processing used in mobile telephony, speech recognition, and other applications.

Turning now to FIG. 2, a block diagram of a signal processing system 200 including DSP 110 according to an embodiment is shown. One or more analog signals may be provided by an external source, e.g., antenna 105, to a signal conditioner 202. Signal conditioner 202 is configured to perform certain preprocessing functions upon the analog signals. Exemplary preprocessing functions may include mixing several of the analog signals together, filtering, amplifying, etc. An analog-to-digital converter (ADC) 204 is coupled to receive the preprocessed analog signals from signal conditioner 202 and to convert the preprocessed analog signals to digital signals consisting of samples, as described above. The samples are taken according to a sampling rate determined by the nature of the analog signals received by signal conditioner 202. The DSP 110 is coupled to receive digital signals at the output of the ADC 204. The DSP 110 performs the desired signal transformation upon the received digital signals, producing one or more output digital signals. A digital-to-analog converter (DAC) 206 is coupled to receive the output digital signals from the DSP 110. The DAC 206 converts the output digital signals into output analog signals. The output analog signals are then conveyed to another signal conditioner 208. The signal conditioner 208 may perform post-processing functions upon the output analog signals. Exemplary post-processing functions are similar to the preprocessing functions listed above. Any suitable configuration of these devices may be coupled into a signal processing system 200 with the DSP 110.

Turning next to FIG. 3, a signal processing system 300 according to another embodiment is shown. In this embodiment, a digital receiver 302 is configured to receive one or more digital signals and to convey the received digital signals to the DSP 110. As with the embodiment shown in FIG. 2, DSP 110 performs the desired signal transformation upon the received digital signals to produce one or more output digital signals. Coupled to receive the output digital signals may be a digital signal transmitter 304. In one exemplary application, the signal processing system 300 may be a digital audio device in which the digital receiver 302 conveys to the DSP 110 digital signals indicative of data stored on the digital storage device 120. The DSP 110 may then process the digital signals and conveys the resulting output digital signals to the digital transmitter 304. The digital transmitter 304 may then cause values of the output digital signals to be transmitted to the display driver 130 to produce a video image on the display 125.

Figure 4:
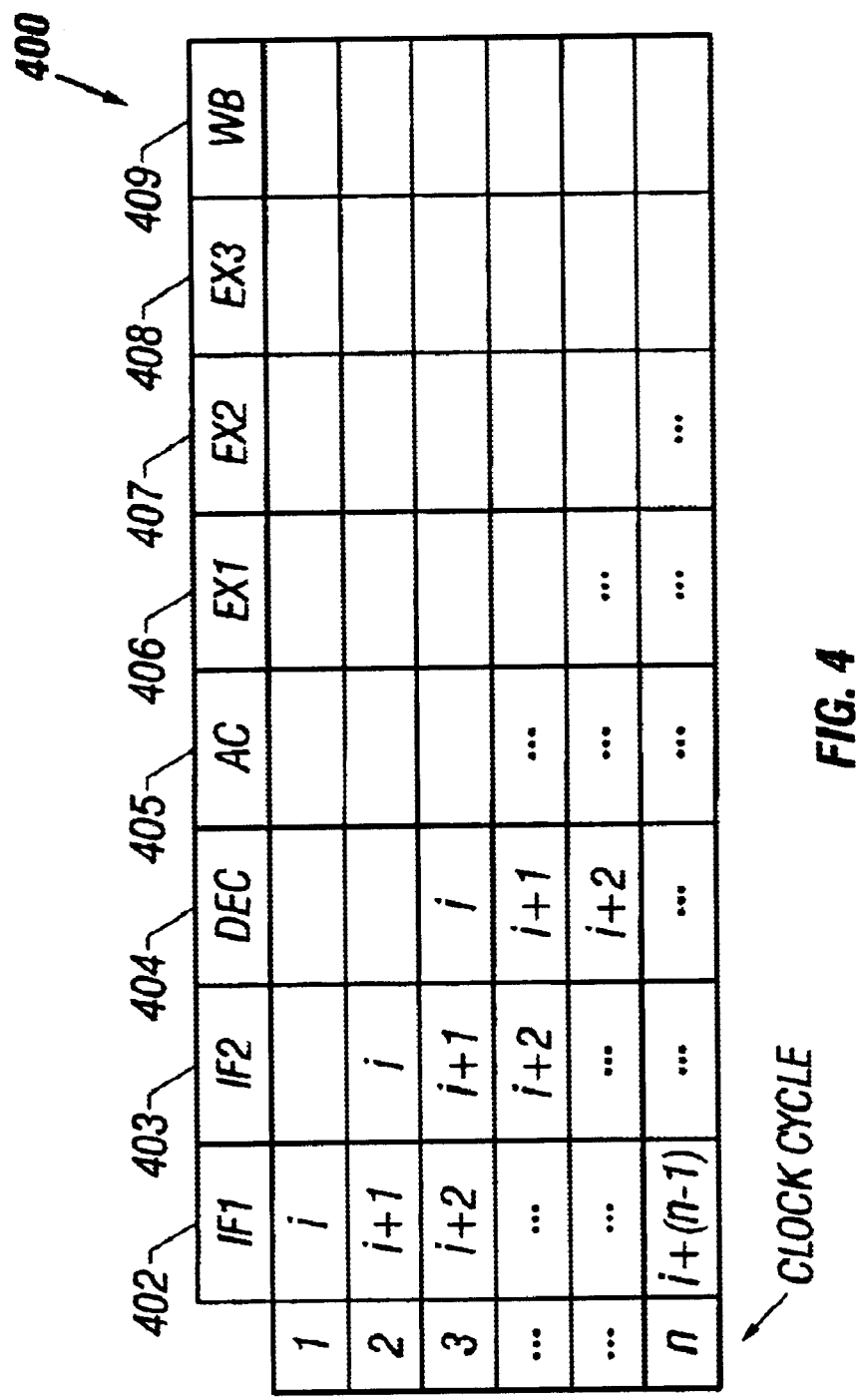
FIG. 4 illustrates exemplary pipeline stages of the processor in FIG. 1 according to an embodiment.

The pipeline illustrated in FIG. 4 may include eight stages, which may include instruction fetch 402–403, decode 404, address calculation 405, execution 406–408, and write-back 409 stages. An instruction i may be fetched in one clock cycle and then operated on and executed in the pipeline in subsequent clock cycles concurrently with the fetching of new instructions, e.g., i+1 and i+2.

Pipelining may introduce additional coordination problems and hazards to processor performance. Jumps in the program flow may create empty slots, or "bubbles," in the pipeline. Situations that cause a conditional branch to be taken or an exception or interrupt to be generated may alter the sequential flow of instructions. After such an occurrence, an new instruction must be fetched outside of the sequential program flow, making the remaining instructions in the pipeline irrelevant. Methods such as data forwarding, branch prediction, and associating valid bits with instruction addresses in the pipeline may be employed to deal with these complexities.

The instruction in program code executed by the DSP 110 may have an associated instruction address, or program count (PC), which points to that instruction's location in memory. Program code may be executed sequentially unless an event occurs, such as a taken branch or an interrupt, that causes the program counter to branch to a different location. Thus, absent a change in program flow, the PC of a subsequent instruction may be determined by adding the instruction width of the current instruction to the PC of the current instruction. For example, if the PC of the current instruction is 0x2002 and the instruction is 16-bits (two bytes) wide, the PC of the subsequent instruction would be 0x2004. For fixed width instructions, such PC calculations may be straightforward. However, for a DSP 110 utilizing variable-width instructions, the width of the instruction may not be determined until the instruction is decoded in the decode stage, thereby complicating calculation of the PC of the next instruction, and coordination in the pipeline.

Figure 5:
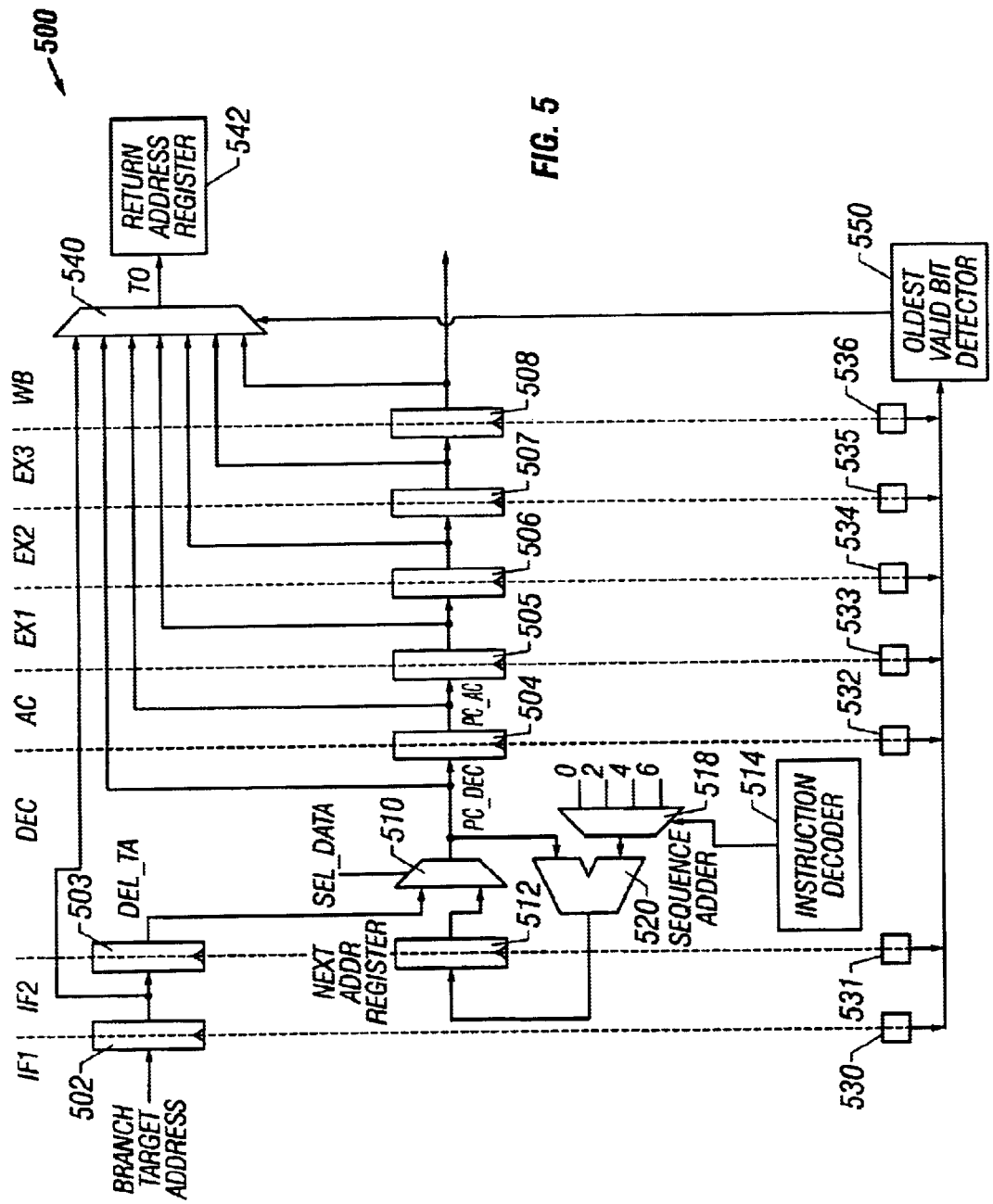
FIG. 5 illustrates an address pipeline including program count (PC) generation logic according to an embodiment.

FIG. 5 illustrates an address pipeline 500 to generate and carry the address of every instruction to every pipeline stage. The address pipeline 500 may calculate PCs for either fixed-width or variable-width instructions. The address pipeline 500 includes address registers 502–508 corresponding to the various instruction pipeline stages, e.g., IF1, IF2, DEC, etc. A program count (PC) multiplexer (MUX) 510 in the decode (DEC) stage may select between a branch target address in register 503 and a PC in a Next Address register 512. The Next Address register 512 may contain a PC calculated by PC generation logic according to an embodiment, as described below. The selected PC may then be passed down the pipeline through the downstream address registers 504–508 in subsequent cycles.

Figure 6:
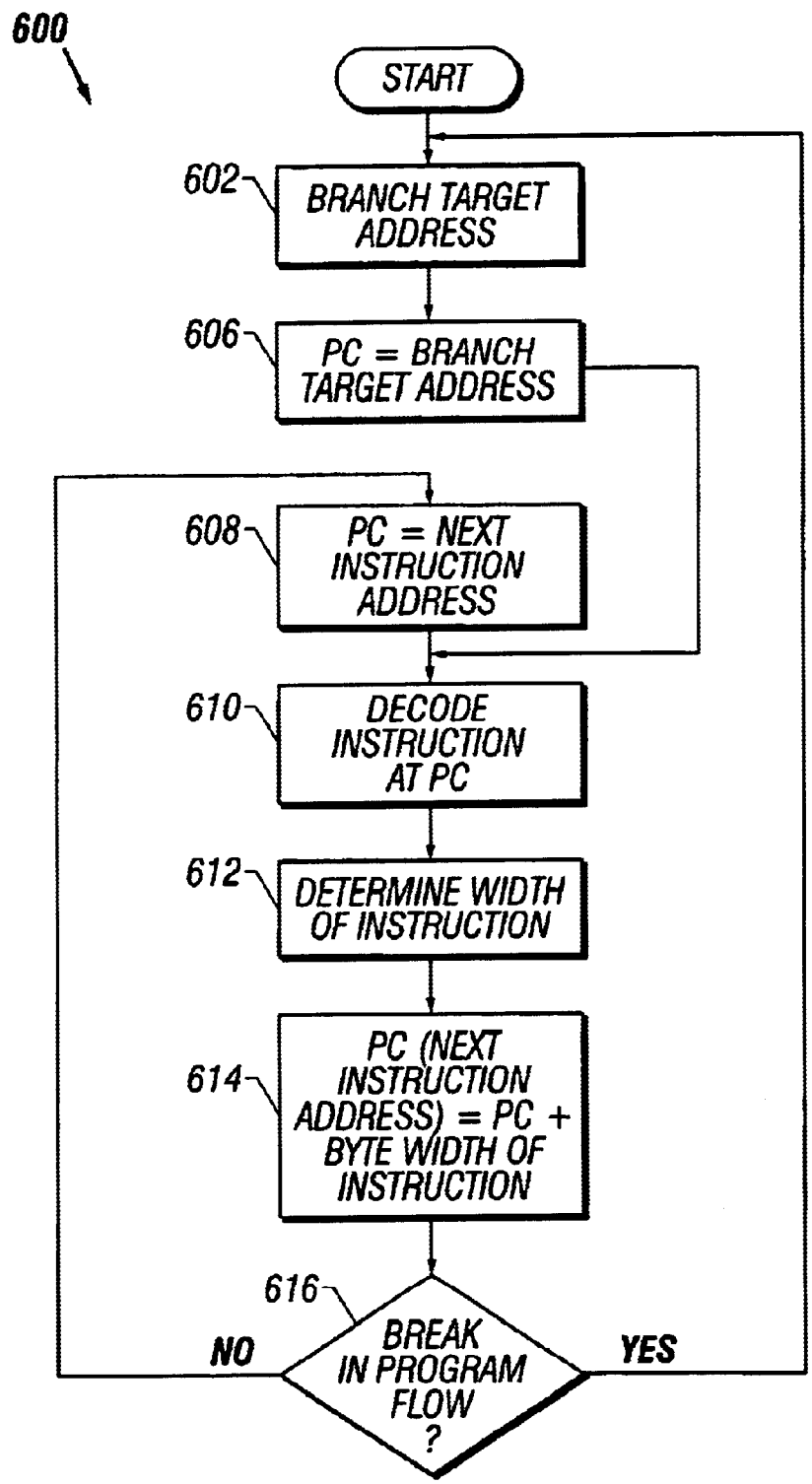
FIG. 6 is a flow chart describing an address calculation operation according to an embodiment.

FIG. 6 illustrates a PC generation and tracking operation 600 according to an embodiment. The following description is one embodiment of implementing the operation 600. In other embodiments, states may be skipped or performed in a different order.

For each break in program flow, a branch target address may be stored in the address register 502 in state 602. A branch target address may be supplied by a branch unit in response to a conditional branch, by an event vector table to fetch the first instruction in an event service routine, or from a return operation. The branch target address may be written to the address register 503 in the next cycle, and the PC MUX 510 may select the branch target address from the address register 503 in state 606. An instruction decoder 514 in state 610 may decode the instruction corresponding to the PC selected by the PC MUX 510 and determine the instruction's width in state 612. The width of the instruction may be predecoded in the IF2 pipeline stage.

Based on the decoded instruction width, a MUX 518 may select an instruction width of zero (0), two (2), four (4), or eight (8), for 0-bit, 16-bit, 32-bit, and 64-bit instructions, respectively. A 0-bit instruction width may indicate an invalid instruction, for example, a killed instruction or a bubble inserted into the pipeline at a stalled stage. The selected instruction width may then be added to the PC selected by the PC MUX 510 by a sequence adder 520 in the next cycle to calculate a "next" PC corresponding to the location of the next sequential instruction in the program flow. This calculated PC may be stored in the Next Address register 512.

Absent a determination of a break in the program flow in state 616, the PC MUX 510 may select the calculated PC stored in the Next Address register 512 in state 608. However, if a break in program flow is determined in state 616, the PC MUX 510 select the branch target address stored in the address register 502, and the operation may return to state 602.

Certain events, such as interrupts and exceptions, may cause a temporary break in the program flow. Such an event may make certain remaining instructions in the pipeline invalid. However, once the disruptive event has been handled, it may be desirable to return to the oldest valid instruction in the pipeline prior to the occurrence of the event in order to resume the original program flow.

According to an embodiment, each PC in the address pipeline 500 (FIG. 5) may have an associated valid bit. The valid bit may have a TRUE value if the associated instruction is valid and a FALSE value if the associated instruction is invalid. The valid bits may be stored in valid bit latches, or flip-flops (FFs), 530–536 corresponding to the various pipeline stages. When a disruptive event occurs, an oldest valid bit detector 550 may determine the oldest valid bit, and hence oldest valid instruction, in the pipeline. The PC associated with the oldest valid bit may be selected by a Return MUX 540 to be stored in a Return Address register 542. Once the disruptive event has been handled, the program flow may resume at the PC stored in the Return Address register 542.

Once the above-described PC generation logic is loaded, it may remain self-maintaining, fully pipelined, and interlocked with the instruction pipeline.

A number of embodiments of the invention have been described. Nevertheless, it will be understood that various modifications may be made without departing from the spirit and scope of the invention. Accordingly, other embodiments are within the scope of the following claims.

What is claimed is:

1. A method for generating addresses for variable-width instructions in a pipeline including at least a decode stage and one or more subsequent pipeline stages, comprising:
   calculating a next sequential address from a stored address and an instruction width of a first instruction in the pipeline, wherein said calculating is performed in the decode stage; and
   selecting between a branch target address and said next sequential.

2. The method of claim 1, further comprising:
   decoding a second instruction corresponding to the selected one of the branch target address and the next sequential address;
   determining an instruction width of the second instruction; and
   adding the instruction width of the instruction to the selected one of the branch target address and the next sequential address.

3. The method of claim 2, wherein the variable-width instructions have a width selected from 16-bit, 32-bit, and 64-bit widths.

4. The method of claim 2, further comprising:
   passing the selected one of the branch target address and the next sequential address down the pipeline fully interlocked with the second instruction.

5. The method of claim 1, further comprising:
   associating a valid bit to each address in the pipeline; and
   storing the address corresponding to an oldest valid bit in the pipeline in response to an event.

6. The method of claim 5, wherein the event is an interrupt.

7. The method of claim 5, wherein event is an exception.

8. An apparatus, including instructions residing on a machine-readable medium, for use in generating addresses for variable-width instructions in a pipeline including at least a decode stage and one or more subsequent pipeline stages, the instructions causing the machine to:
   calculate a next sequential address from a stored address and an instruction width of a first instruction in the pipeline, wherein said next sequential address is calculated in the decode stage; and
   select between a branch target address and said next sequential address.

9. The apparatus of claim 8, further comprising instructions that cause the machine to:
   decode a second instruction corresponding to the selected one of the branch target address and the next sequential address;
   determine an instruction width of the second instruction; and
   add the instruction width of the instruction to the selected one of the branch target address and the next sequential address.

10. The apparatus of claim 9, wherein the variable-width instructions have a width selected from the 16-bit, 32-bit, and 64-bit widths.

11. The method apparatus of claim 9, further comprising instructions that cause the machine to:
    pass the selected one of the branch target address and the next sequential address down the pipeline fully interlocked with the second instruction.

12. The apparatus of claim 8, further comprising instructions that cause the machine to:
    associate a valid bit to each address in the pipeline; and
    store the address corresponding to a oldest valid bit in the pipeline in response to an event.

13. The apparatus of claim 12, wherein the event is an interrupt.

14. The apparatus of claim 12, wherein event is an exception.

15. Apparatus for generating an address of an instruction in a pipeline including at least a decode stage and one or more subsequent pipeline stages, comprising:
    an instruction decoder to decode the instruction, said instruction having an instruction width;
    a selection circuit to select a branch target address over a first calculated address in response to a break in a program flow, said first calculated address being calculated in the decode stage; and
    an adder to add the instruction width of the instruction to the address selected by the selection circuit to generate a second calculated address.

16. The apparatus of claim 15, wherein the pipeline operates to pass variable-width instructions.

17. The apparatus of claim 16, wherein the variable-width instructions have a width selected from 16-bit, 32-bit, and 64-bit widths.

18. The apparatus of claim 15, wherein each address in the pipeline has an associated valid bit, and further comprising:
    a valid bit detection circuit in each of a plurality of stages in the pipeline to determine the oldest valid bit in the pipeline; and
    a return register to store an address associated with the oldest valid bit.

19. A system comprising:
    a flash memory; and
    a processor coupled to the flash memory and including a pipeline including at least a decode stage and one or more subsequent pipeline stages, said processor being adapted to:
    calculate a next sequential address from a stored address and an instruction width of a first instruction in the pipeline, wherein said next sequential address is calculated in the decode stage; and
    select between a branch target address and said next sequential address.

20. The system of claim 19, wherein the variable-width instruction has a width selected from 16-bit, 32-bit, and 64-bit widths.

* * * * *

UNITED STATES PATENT AND TRADEMARK OFFICE
CERTIFICATE OF CORRECTION

PATENT NO.    : 6,789,184 B1
DATED         : September 7, 2004
INVENTOR(S)   : Ravi P. Singh, Charles P. Roth and Gregory A. Overkamp It is certified that error appears in the above-identified patent and that said Letters Patent is hereby corrected as shown below:

Column 5,
Line 37, after "the" (second occurrence), add -- second --.
Line 53, after "wherein", add -- the --.

Column 6,
Line 6, after "the" (second occurrence), add -- second --.
Line 20, delete "a", substitute -- an --.
Line 24, after "wherein", add -- the --.
Line 46, delete "the" (second occurrence), substitute -- an --.
Line 62, delete "variable-width", substitute -- first --.

Signed and Sealed this

Fifth Day of July, 2005

JON W. DUDAS
*Director of the United States Patent and Trademark Office*